United States Patent [19]
Hendershot et al.

[11] Patent Number: 5,636,822
[45] Date of Patent: Jun. 10, 1997

[54] COMPUTER MOUSE SUPPORT

[75] Inventors: Thomas E. Hendershot; Daniel R. Johnson-Zeh, both of Grand Rapids, Mich.

[73] Assignee: Steelcase Inc., Grand Rapids, Mich.

[21] Appl. No.: 512,878

[22] Filed: Aug. 9, 1995

[51] Int. Cl.$^6$ ................................................ A47B 91/00
[52] U.S. Cl. .......................... 248/346.01; 248/51; 403/61
[58] Field of Search .................................. 248/917, 918, 248/919, 920, 921, 922, 923, 924, 442.2, 346.01, 118, 51, 52; 403/59, 61

[56] References Cited

U.S. PATENT DOCUMENTS

| | | |
|---|---|---|
| D. 328,892 | 8/1992 | Miller . |
| D. 342,242 | 12/1993 | Hassell et al. . |
| 1,599,124 | 9/1926 | Fisher ........................... 248/52 X |
| 2,483,834 | 10/1949 | Maindal ........................... 248/51 |
| 4,494,755 | 1/1985 | Caillouet, Jr. . |
| 4,561,619 | 12/1985 | Robillard et al. . |
| 4,693,443 | 9/1987 | Drain . |
| 4,709,972 | 12/1987 | LaBudde et al. . |
| 4,863,124 | 9/1989 | Ball et al. . |
| 4,913,387 | 4/1990 | Tice . |
| 4,949,080 | 8/1990 | Mikan . |
| 4,973,176 | 11/1990 | Dietrich . |
| 5,119,742 | 6/1992 | Simmie . |
| 5,125,606 | 6/1992 | Cassano et al. . |
| 5,131,614 | 7/1992 | Garcia et al. . |
| 5,165,630 | 11/1992 | Connor . |
| 5,203,845 | 4/1993 | Moore . |
| 5,351,508 | 10/1994 | Kelley ........................... 248/919 X |
| 5,351,897 | 10/1994 | Martin ........................... 248/918 X |
| 5,433,407 | 7/1995 | Rice ........................... 248/118.1 |
| 5,443,237 | 8/1995 | Stadtmauer ........................... 248/918 X |
| 5,509,628 | 4/1996 | Noble ........................... 248/918 X |

OTHER PUBLICATIONS

*PC Magazine*, May 14, 1991, vol. 10, No. 9., 4 page magazine publication (including magizine cover, article on p. 42 and a copy of a two page advertisement) showing MicroComputer Accessories.
Details Advertisement, 1 page publication on Details Keyboard Solutions, copyright 1993.
StratNova Inc. "The Package" Articulating Keyboard Arm, 3 page publication, date unknown.

*Primary Examiner*—Ramon O. Ramirez
*Attorney, Agent, or Firm*—Price, Heneveld, Cooper, DeWitt & Litton

[57] ABSTRACT

A computer mouse accessory includes a platform having a substantially planar upper surface upon which a computer mouse can be operated, a bracket for mounting the accessory to a support structure, such as keyboard shelf, the platform being secured to the bracket in a manner which allows for linear movement of the platform with respect to the bracket along a generally horizontal line. The linear adjustability of the platform relative to the bracket allows the platform to be positioned anywhere between a fully deployed position wherein the platform is located laterally adjacent to an end of a computer keyboard shelf to which the bracket is secured, and a fully retracted position wherein the platform overlies one side of the keyboard so that when the keyboard shelf is mounted on an articulated arm secured to the underside of a worksurface of the desk, the keyboard shelf and computer mouse accessory can be store together beneath the worksurface. The platform of the computer mouse accessory is desirably tiltable with respect to a portion of the bracket which is stationary when mounted to a structure, and is also preferably rotatable with respect to the bracket, to provide a full range of motion which provides an exceptionally flexible, ergonomically adaptable, mousing surface which can be positioned to comfortably accommodate most mouse users.

22 Claims, 6 Drawing Sheets

COMPUTER MOUSE SUPPORT

BACKGROUND OF THE INVENTION

This invention relates to computer accessories and more particularly to a support for a computer mouse or the like.

Various computer accessories have been developed to reduce the amount of worksurface area of a desk or other furniture which is occupied by computer accessories. For example, various devices with articulated arms have been developed to support video displays and computer keyboards or other input devices on auxiliary surfaces thereby increasing the availability of desk tops and other worksurfaces for other purposes. In addition to reducing the amount of desk top and other worksurfaces which are required by computer devices, it is desirable that the auxiliary support surfaces be mounted in a manner which allows the computer devices to be quickly and easily stored, such as beneath the worksurface of a desk when not in use, and rapidly deployed when needed. Computer keyboard support trays which are supported on an articulated bracket assembly secured to the underside of a worksurface are now well known and commonly employed. However, various auxiliary input devices such as a computer mouse are generally operated on a mouse pad supported on a worksurface. Although it is possible to store the mouse and the mouse pad, such as in a drawer, in order to increase available worksurface area, it is generally more common to leave the mouse and mouse pad on the worksurface because of the inconvenience involved in storing and retrieving the mouse and mouse pad on a regular basis.

In addition to occupying often needed worksurface areas, another disadvantage with conventional mouse pads is that they are generally comprised of a flat sheet of plastic; or other material which is usually supported on a horizontal worksurface so that operation of the computer mouse is limited to movement of the mouse over a horizontal surface. Many users of mouse devices find it easier and more comfortable to operate the mouse on an inclined surface. The preferred inclination of the mouse pad surface can vary from one individual to another and can vary from one time to another for a particular individual. Accordingly, conventional mouse pads are not as ergonomically desirable as they could be on account of the inability to adjust the inclination thereof.

Another ergonomic disadvantage with conventional mouse pads is that they are not particularly easy to use in combination with a keyboard mounted on an auxiliary support surface such as a keyboard shelf. Specifically, in the case of keyboards mounted on an auxiliary support surface, the mouse and mouse pad are generally positioned relatively remote from the keyboard so that a computer user who is frequently alternating between keyboard and mouse input may have to stretch or reposition themselves to operate the mouse. Many computer users will find it easier and more comfortable to alternate between keyboard and mouse input if the mouse is located laterally adjacent to the edge of the keyboard.

Various attempts to resolve the foregoing problems have been proposed. For example, U.S. Pat. No. 5,119,742 to Simmie discloses a mountable worksurface for the operation of a computer mouse which is adapted to be mounted on a keyboard tray. The disclosed apparatus provides an auxiliary worksurface for computer mouse use adjacent to a computer keyboard thus reducing the amount of desk top or other worksurface area which would otherwise be occupied by a mouse and mouse pad, and placing the mouse pad laterally adjacent to the edge of the keyboard. However, in addition to failing to provide a mouse surface which can be inclined to improve the comfort and ease with which the mouse can be operated, the mouse worksurface of the apparatus extends outwardly from one of the lateral edges of the keyboard shelf in fixed spacial relationship to the keyboard. This creates a disadvantage with respect to the use of such apparatus in combination with a keyboard shelf which is mounted to an articulated arm secured to the underside of a worksurface at the kneewell of a conventional desk. Specifically, the combined length of the keyboard shelf and the mouse worksurface can exceed the length of the kneewell, making it impossible to store the keyboard shelf beneath the worksurface without first remove the mouse worksurface.

SUMMARY OF THE INVENTION

The above mentioned disadvantages of known mouse pads and mountable auxiliary worksurfaces for operation of the computer mouse are overcome by the present invention which provides a computer mouse accessory having a platform with a substantially planar upper surface upon which a computer mouse can be operated and a bracket for mounting the accessory to a support structure, the platform being secured to the bracket for linear movement with respect to the bracket.

In accordance with the preferred aspect of the invention the platform is provided with channel members which are secured to the underside of the platform in spaced, parallel relationship to form a pair of spaced channels having openings which face each other. The bracket includes a guide member having opposing flange edges which are confined within the channels formed by the channel members and the underside of the platform. The resulting structure allows the platform to be moved linearly along a direction parallel to the channel members with the upper and lower surfaces of the flange edges slidingly engaging the underside of the platform and the upper side of the channel members, respectively.

In accordance with the further aspect of the invention the platform is tiltable with respect to at least a portion of the bracket which is stationary when mounted to a structure. Preferably the bracket is comprised of two members which are pivotally adjustable with respect to one another. More specifically, in accordance with one mode practicing the invention, the bracket is comprised of a first and second member, with each of said members having an upright wall portion one of the wall portions having a pair of spaced apertures, the other wall portion having an aperture and an arcuate slot. A fastener passing through one of the apertures in the first upright wall portion and the aperture in the second upright wall portion serves as a pivot axis about which the members of the bracket can be rotated with respect to one another. The extent of rotation of one member with respect to another is limited by a second fastener passing through the other of the slots in the first wall and through the arcuate slot in the second upright wall. The arcuate slot defines an arc segment of a circle centered at the first fastener, whereby the second member can be pivoted with respect to the first member about a longitudinal axis of the first fastener through an angle defined by the arcuate slot.

In accordance with a preferred feature of the invention, the platform is rotatable with respect to the bracket about an axis which is substantially perpendicular to the upper surface of the platform.

The platform desirably defines a notch for mouse wire management. More specifically, the platform preferable includes a notch with a narrow mouth through which the wire can be squeezed through from an edge of the platform. The notch preferably opens up into a larger area wherein the wire can pass freely upwardly and downwardly and from side to another side.

Another feature of the invention involves a mouse containment device which is secured to the underside of the platform and permits storage of the computer mouse therein.

Another important aspect of the invention involves a combination computer keyboard support and computer mouse support assembly including a computer keyboard shelf, a bracket mounted to the computer keyboard shelf, and a computer mouse platform mounted on the bracket, the platform being linearly movable with respect to the bracket.

The mouse support accessory of the invention can be retrofitted to any of various keyboard shelves, generally without limitation. The linear adjustability of the platform allows a mouse user to position the platform laterally adjacent to either the left-hand or right-hand side of a computer shell, inwardly toward the transverse centerline of the keyboard, so that the platform overlaps one side of the keyboard, or the platform can be positioned at any location in between. This range of linear adjustability allows some flexibility in positioning of the platform to provide optimum comfort to a person using the mouse surface of the platform. More importantly the linear adjustability allows the platform to be positioned over an end of the keyboard so that the mouse accessory can be used with a keyboard shelf mounted on an articulated arm secured to tile underside of a worksurface, and be stored with the keyboard beneath the worksurface without being blocked by the pedestals of the desk. In accordance with preferred aspects of the invention, the platform is also rotatably adjustable and tiltable to provide a relatively complete range of adjustability to comfortably accommodate a variety of mouse users.

DESCRIPTION OF THE PREFERRED EMBODIMENTS

Figure 1:
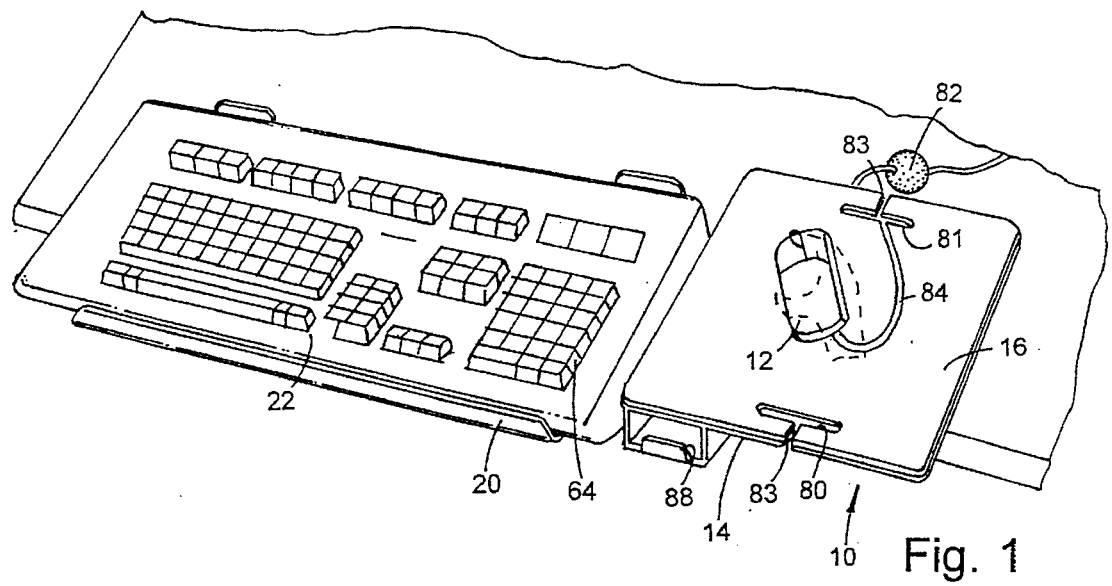
FIG. 1 is a perspective view of a computer mouse accessory in accordance with the invention which is attached to a keyboard shelf.

A mouse support accessory 10 having a surface upon which a computer mouse device 12 can be moved for operation thereof is shown in FIG. 1. The mouse support includes a planar, generally rectangular shaped platform 14 upon which a mouse pad 16 is secured, and a bracket 18 (FIG. 2) for attaching the mouse support 10 m a computer keyboard shelf 20. Keyboard shelf 20 can be of the type associated with a variety of known keyboard support assemblies, such as the keyboard support assembly disclosed in U.S. Pat. No. 5,230,289 to George et al., which is hereby incorporated by reference herein. The mouse 10 provides a convenient surface for operation of a computer mouse device 12 immediately adjacent m the computer keyboard 22.

As shown in FIGS. 2, 4 and 7–11, bracket 18 is comprised of a first L-shaped member 24 having a substantially that, horizontal base portion 26 with a slot 28 at one end for attaching bracket 18 to keyboard shelf 20, and an upright wall portion 30 at the opposite end. A second L-shaped member 32 has an upright wall portion 34 which is secured to an abuttingly adjacent upright portion 30 of member 24, and a substantially horizontal portion 36 which projects from the upper end of portion 34 in a direction away from member 24. Member 32 is attached to member 24 with fasteners such as bolts 38, 39 (FIG. 11) which pass through spaced apart apertures 40,41 in upright portion 30 of member 24, and aperture 42 and arcuate slot 43 in upright portion 34 of member 32. Arcuate slot 43 allows member 32 to be manually pivoted relative to member 24 about the longitudinal axis of bolt 38. Internally threaded locknut 44 and internally threaded nut 46 engage the external threads of bolts 38, 39 respectively to fix the position of member 32 relative to member 24. Washers 47, 48 are disposed on the threaded shank portions of bolts 38, 39, respectively, between outboard surface of upright portion 34 and nuts 44, 46, respectively, to reduce wear and abrasion when the angle of member 32 relative to member 24 is adjusted.

A substantially horizontal guideway comprising a pair of parallel channel members 48, 49 is provided on the underside of platform 14 for receipt of opposing horizontal wings or flanges 50,41 of a guide member 52. The channel members 48, 49 are welded or otherwise secured to the underside of platform 14 in spaced, parallel relationship, with the ends of the channel members curved upwardly toward the underside of the platform to serve as stops which limit the travel of the guide member 52. The channel members in combination with the underside of platform 14 define a pair of U-shaped channels, the openings of which face each other. Guide member 52 has an indented central horizontal portion 54 which is attached to the upper side of horizontal portion 36 of member 32 by means of a single bolt 56 which passes through a circular aperture in the central portion 54 of member 52 and a circular aperture 58 in portion 36 of member 32. Bolt 56 is secured in the aperture of central portion 54 and aperture 58 by a locknut 60.

Figure 5:
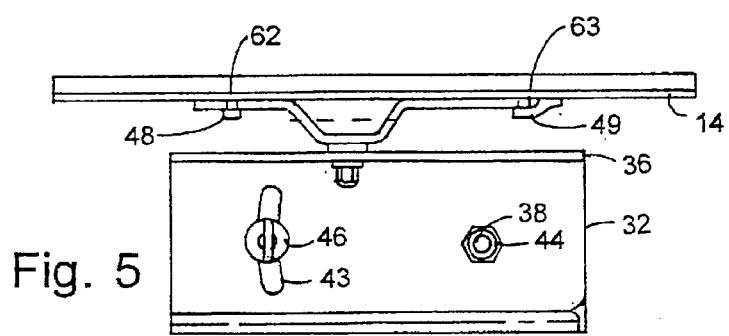
FIG. 5 is a partial cross-section, partial elevational view taken along lines V—V of FIG. 4.
Figure 8:
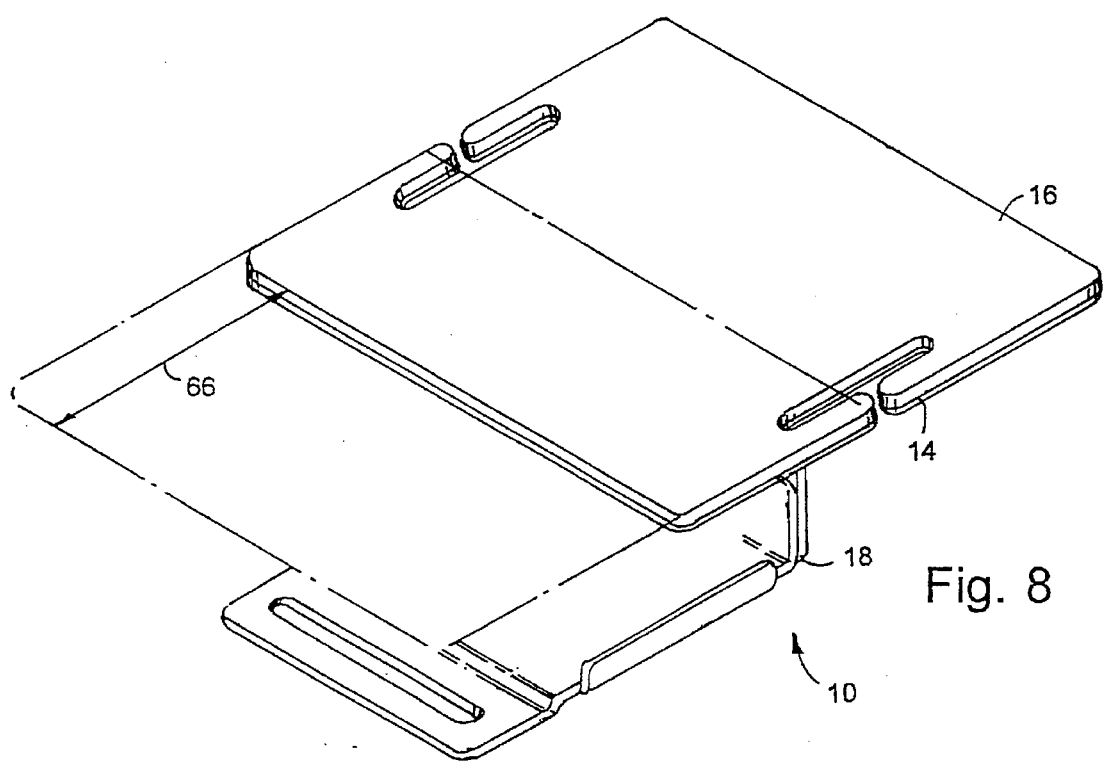
FIG. 8 is a perspective view illustrating the range of linear motion of the platform relative to the bracket of the mouse accessory.

As is best illustrated in FIG. 5, the outer edges 62, 63 of flanges 50, 51 are confined between the upper sides of channel members 48, 49 and the underside of platform 14, with the spacing therebetween being substantially equal to the thickness of flanges 50, 50 so that the sides of the channels bear against and frictionally engage the flange surface, whereby platform 14 is retained ill a desired position by the frictional engagement and can be manually moved linearly with respect to bracket 18 along a direction parallel to channel members 48, 49. Such linear movement of platform 14 with respect to bracket 18 call be achieved by merely sliding the platform on the guide member without loosening or adjusting the fasteners. The extent of linear motion allowed is defined by the difference between the length of the channel members 48, 49 and the length of flanges 50, 51. The extent of linear motion of the platform with respect to the bracket is generally sufficient to allow the platform 14 to be positioned laterally outboard of keyboard 22 (as shown in FIG. 1), inwardly so that platform 14 overlies the member pad portion 64 on the right-hand side of keyboard 22, or anywhere between. Platform 14 can also be moved to any desired position intermediate between the outboard and inboard positions. More specifically, the extent of linear motion of platform 14 with respect to bracket 18 is typically from about 4 to about 6 inches, although the extent of travel can be greater or less if desired by varying the length of the channels defined by channel members 48, 49 and/or the length of flanges 50, 51. FIG. 8 shows platform 14 in the fully extended outboard position in solid outline, and in the fully retracted inboard position in phantom outline. The extent of linear travel of platform 14 with respect to bracket 18 is indicated by arrow 66.

Figure 7:
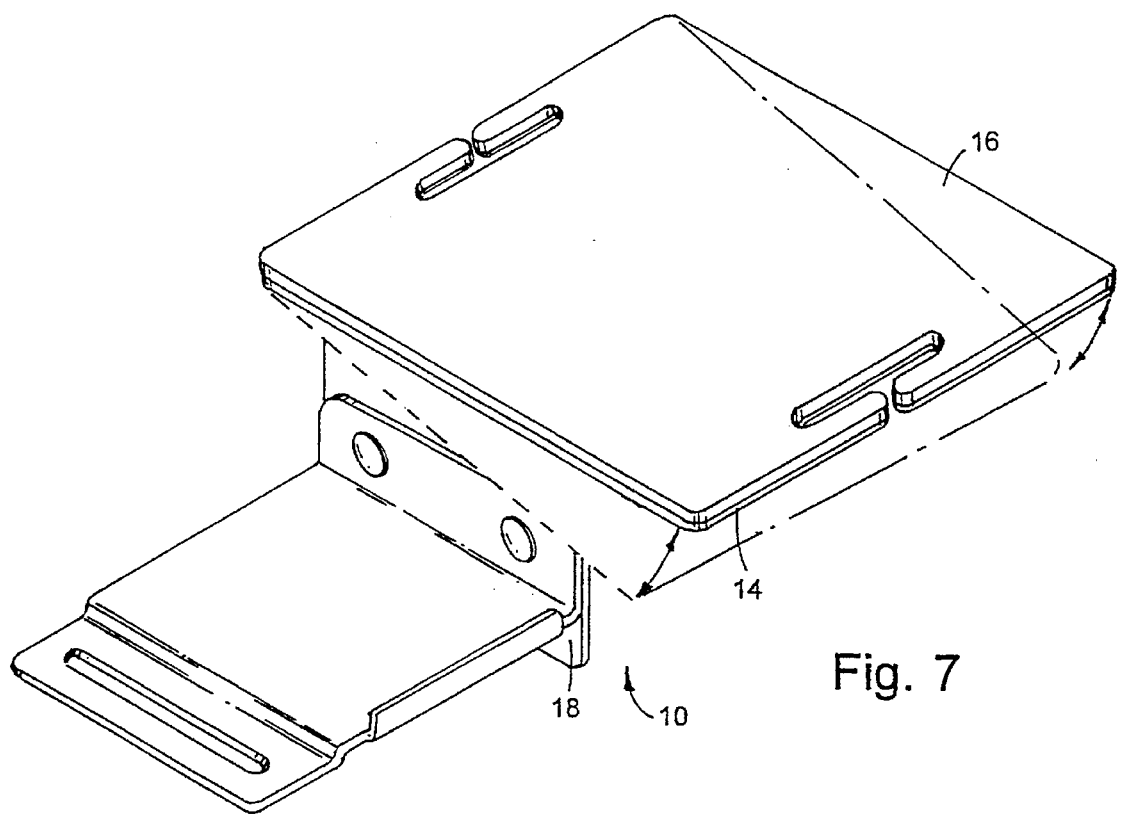
FIG. 7 is a perspective view of the mouse accessory illustrating the tiltability of the platform relative to the portion of the bracket mounted to a computer keyboard.

Platform 14 is also manually tiltable or pivotable with respect to member 24 bracket 18 as shown in FIG. 7 so that platform 14 can be inclined at an angle which the mouse user finds most comfortable. Adjustment of the inclination of platform 14 is achieved by grasping the outwardly projecting handle portion 68 of nut 46 such as between the thumb and index finger, rotating nut 46 to loosen member 32 from member 24, manually adjusting the inclination of platform 14, and retightening nut 46. Arcuate slot 43 of the illustrated embodiment defines approximately a 30 degree arc segment of a circle centered at bolt 38 in aperture 42 to allow platform 14 to be tilted downwardly by up to about 15 degrees when mouse support 10 is attached to the right-hand side of keyboard shelf 20, as shown in FIG. 1, or, alternatively, up to about 15 degrees downwardly when mouse support 10 is attached to the left-hand side of keyboard shelf 20. FIG. 7, which illustrates the tiltability of platform 14 with respect to member 24 of bracket 18, shows platform 14 at the horizontal or zero degree position in solid outline, and shows platform 14 tilted downward by about 15 degrees in phantom outline.

Figure 9:
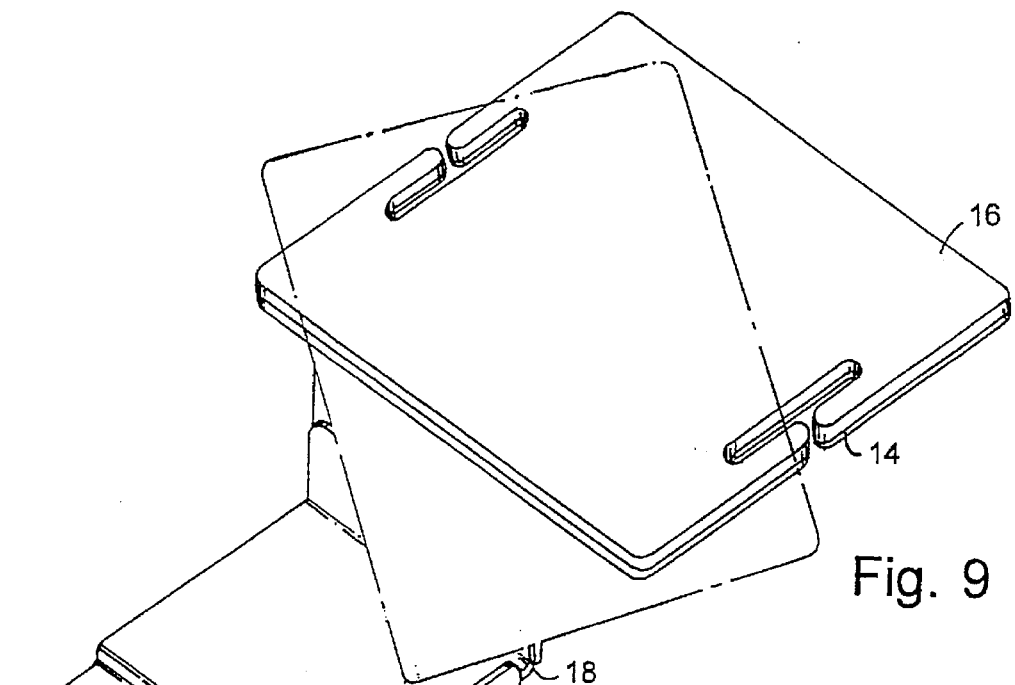
FIG. 9 is a perspective view of the mouse accessory showing the rotatability of the platform relative to)he bracket.
Figure 10:
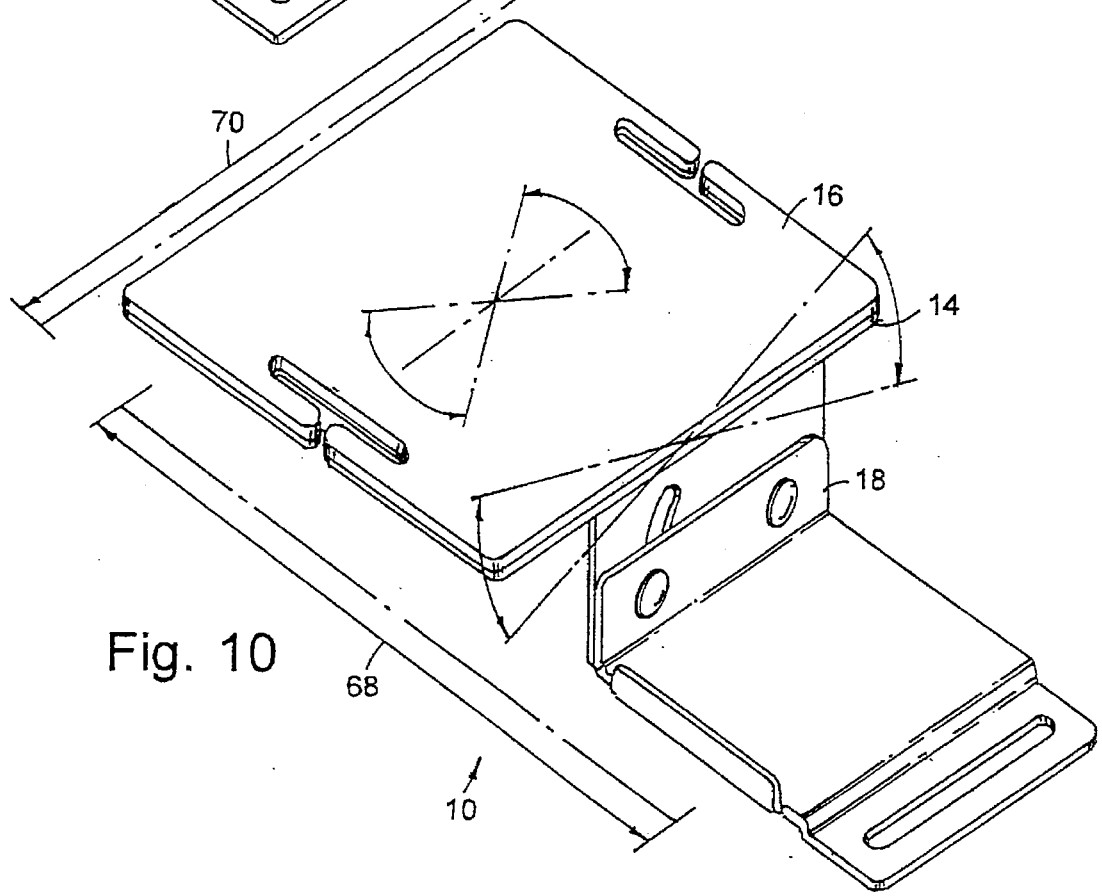
FIG. 10 is a perspective view of the mouse accessory showing the full range of motion of the platform relative to the bracket.
Figure 11:
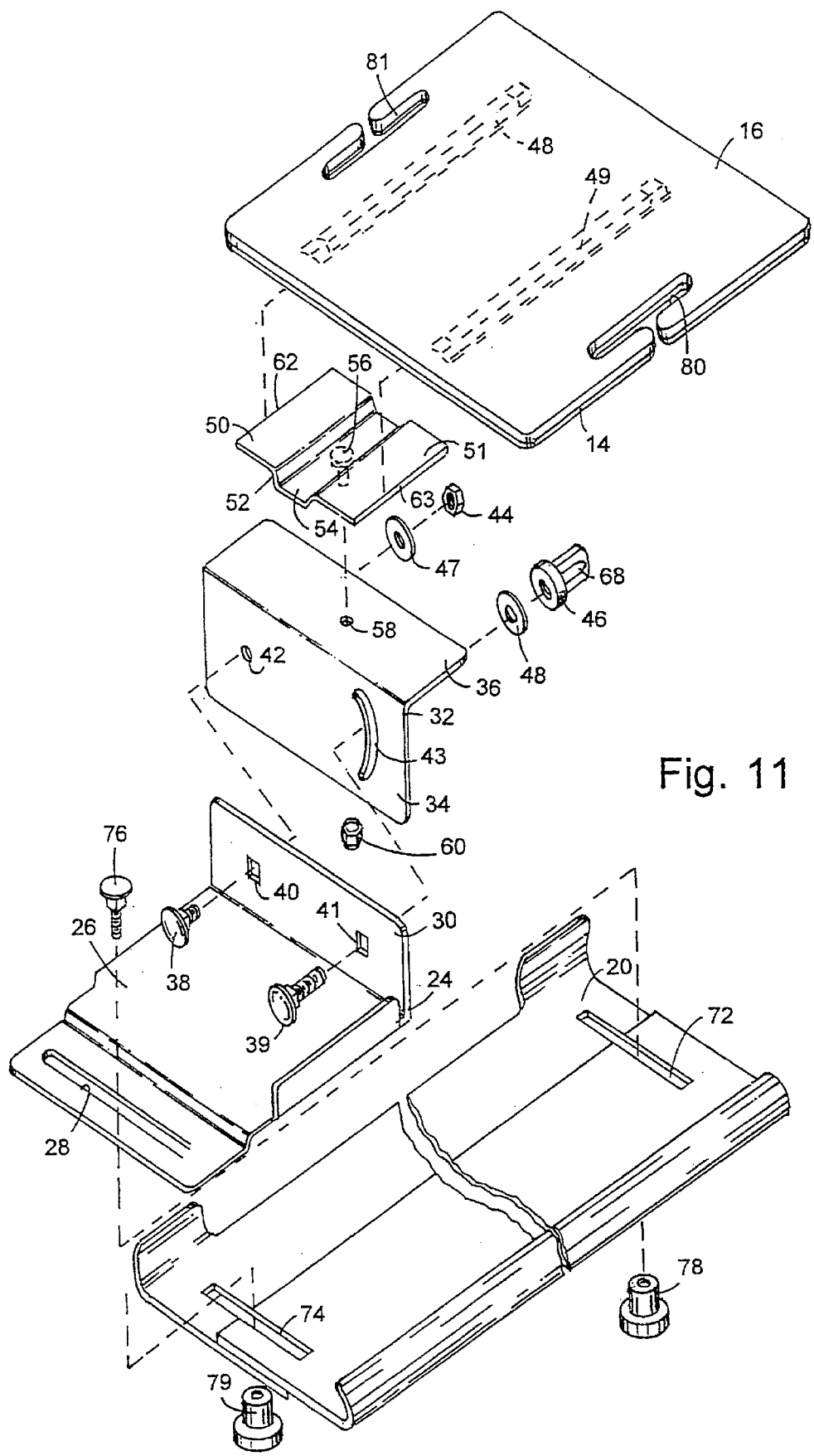
FIG. 11 is an exploded perspective view showing assembly of the various components of the computer mouse accessory.

As shown in FIG. 9, platform 14 is also manually rotatable with respect to bracket 18 about an axis substantially perpendicular to the upper surface of the platform 14. Specifically, guide member 52 and platform 14 can be rotated together relative to member 32 about the longitudinal axis of bolt 56 to any desired angle which the mouse user finds most comfortable and conducive to operation of mouse 12. FIG. 10 indicates the full range of platform positional adjustability provided by mouse support 10. It is worth noting that while the linear adjustability of platform 14 with respect to bracket 14 is normally intended to allow platform 14 to be moved (as indicated by arrow 68) along a direction parallel with the longitudinal direction of keyboard shelf 20, and in particular between an outboard position adjacent to the side of keyboard 22 and an inboard position wherein platform 14 overlies the right-hand side of keyboard 22, it is possible to move platform 14 forwardly and backwardly (as indicated by arrow 70) along a line perpendicular to the longitudinal direction of keyboard shelf 20, if desired, by first rotating platform 14 by 90 degrees from the normal orientation shown in the drawings.

As previously suggested, mouse support 10 is adapted to be mounted to either the left-hand or right-hand side of keyboard shelf 20 to accommodate left or right handed mouse users. FIG. 1 shows the mouse support 10 attached to the right hand side of keyboard shelf 20. However, mouse support 10 can be secured to right-hand aperture or slot 72 of shelf 20 in the manner suggested in FIG. 11, or it can be rotated 180 degrees, about a vertical axis, with respect to the orientation shown in FIG. 11 and secured to the left-hand aperture or slot 74 of shelf 20. In either case, the mouse support 10 is secured to the shelf 20 by abuttingly positioning portion 26 of member 24 either above or beneath shelf 20 with slot 28 of member 24 aligned with an aperture or slot 72, 74 of shelf 20, passing a bolt 76 through slot 28 and slot 72 or 74, and securing the mouse support to shelf 20 with internally threaded knob 78 or 79.

Figure 3:
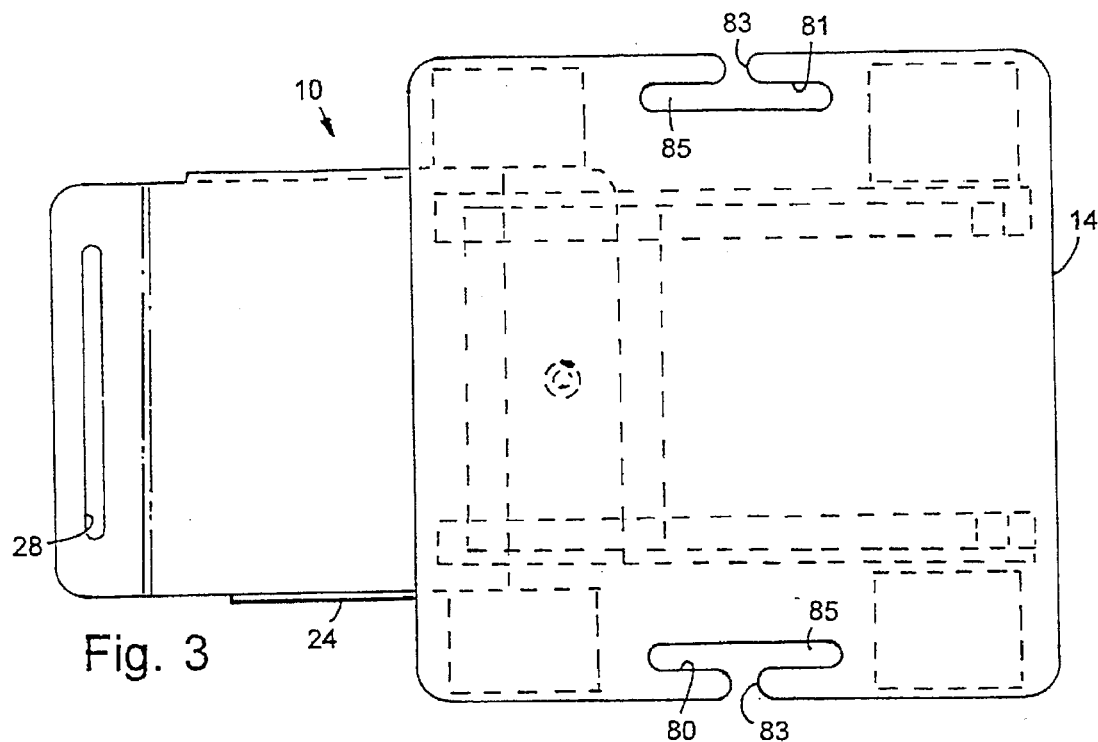
FIG. 3 is a top plan view of the mouse accessory.
Figure 4:
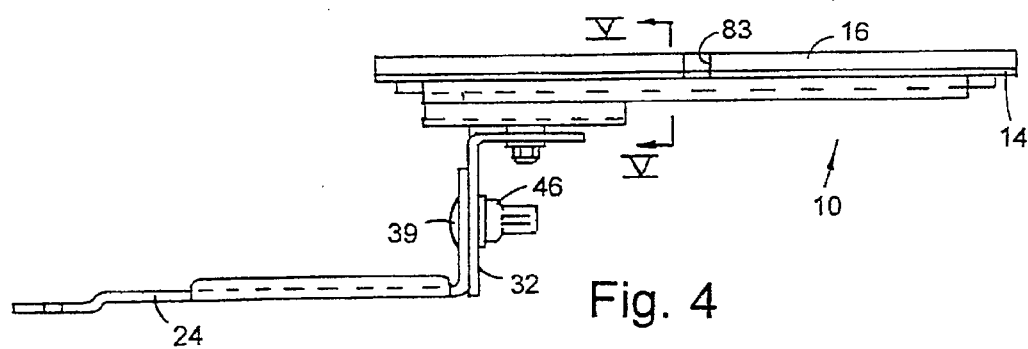
FIG. 4 is a side elevational view of the mouse accessory.

In accordance with a preferred aspect of the invention mouse support 10 includes a mouse wire management system comprised of notches 80, 81 and a safety retainer 82. Notches 80, 81, at opposing sides of platform 14, and pad 16 have a relatively narrow mouth 83 with a gap which is preferably slightly less than the diameter of insulated mouse wire 84 so that the insulation must be slightly compressed in order to squeeze wire 84 therethrough. Inward from the edges of platform 14 and pad 16, past mouth 83, notches 80, 81 include an elongate open region 85 (FIG. 3) which extends parallel with and adjacent to the edges of the platform and the pad. The width of the elongate open regions 84 of notches 80, 81 is desirably sufficient to allow wire 84 to move freely between the ends thereof. Safety retainer 82 is a member which can be attached to wire 84 to help prevent mouse 12 from falling or being knocked off of the upper support surface of mouse support 10. Retainer 82 can have any of a variety of different shapes, other than the illustrated spherical shape, provided that it is of sufficient size so that it cannot pass through notches 80, 81. Retainer 82 is preferably made of a relatively soft, pliable, resilient material such as rubber or plastic and has a wire passageway 86, and a slit 87 which allows wire 84 to be squeezed through from the exterior of retainer 82 to the passageway 86 and be frictionally attached therein. The notches 80, 81 help to prevent wire 84 from interfering with mouse operation. Retainer 82, in cooperation with notch 80 or 81, also helps prevent wire 84 from interfering with mouse operation by limiting the amount of wire which can be threaded through notch 80 or 81. Retainer 82 is also desirably of sufficient weight to draw excess wire from above the top support surface of mouse support 10 through notch 80 or 81.

Figure 2:
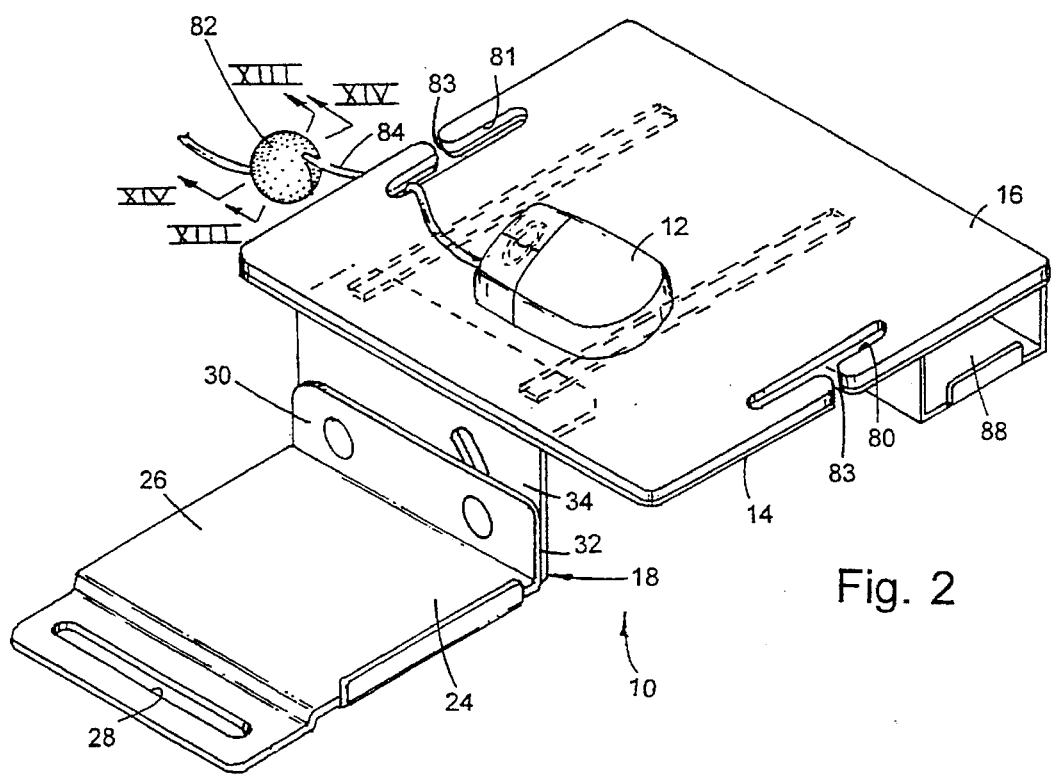
FIG. 2 is a perspective view of the computer mouse accessory showing the bracket used to mount the mouse platform to the keyboard shelf shown in FIG. 1.
Figure 6:
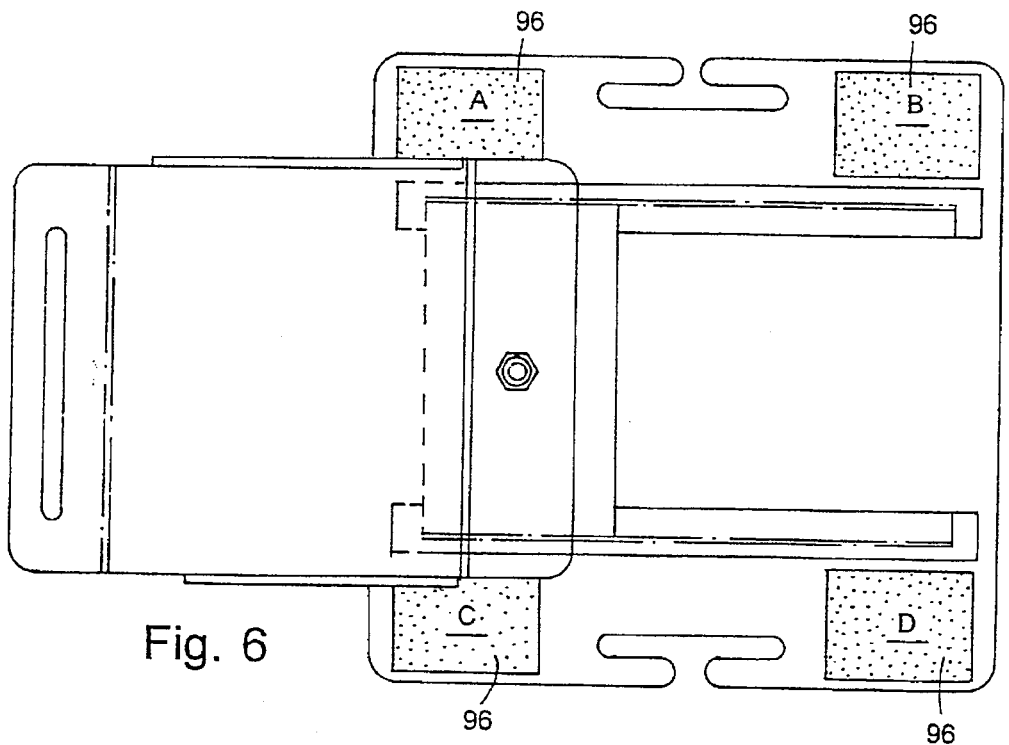
FIG. 6 is a bottom plan view of the mouse accessory.
Figure 13:
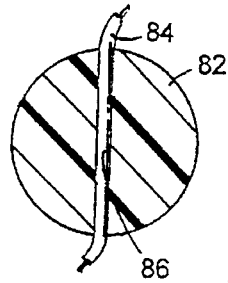
FIG. 13 is a cross section taken along lines XIII—XIII of FIG. 2 showing a retainer used to help prevent a computer mouse from being dropped or knocked off of the upper support surface of the computer mouse accessory, the cross-section being taken through a wire passing through a passageway in the retainer.
Figure 14:
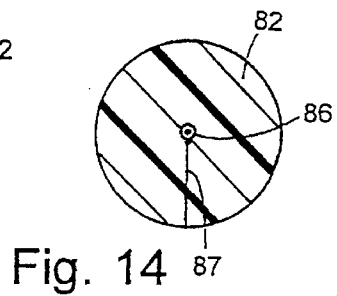
FIG. 14 is a cross-sectional view along lines XIV—XIV of FIG. 2 of the retainer, the cross-section being transverse to the wire passageway through the retainer.
Figure 12:
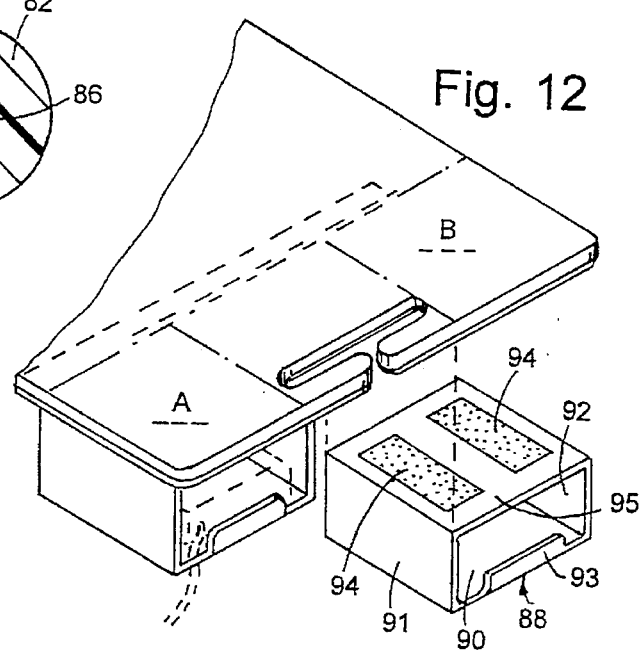
FIG. 12 is a fragmentary perspective view of a mouse containment device used in association with the platform of the computer mouse accessory.

In accordance with another preferred aspect of the invention, the mouse support 10 can be provided with a mouse containment device 88, shown in FIGS. 1, 2 and 12. Containment device 88 includes a support surface 90 (FIG. 12) on which mouse 12 can be stored beneath platform 14. Mouse containment device 88 is preferably a box-like structure having, in addition to a bottom support surface 90, sidewalls 91, 92, a front retainer lip 93 which prevents mouse 12 from falling from the containment device, and a backwall (not shown) which also prevents mouse 12 from falling from the containment device. While containment device 88 can be permanently secured to the underside of platform 14, it is desirable that device 88 be removably attached so that it can be positioned as desired, such as at any of the four corners at the underside of platform 14. One suitable method of removably attaching containment device 88 to the underside of platform 14 is with a plurality of miniature hooks 94 secured to a top side 95 of device 88, which engage loops in a fabric 96 (such as Velcro®) secured to the underside of platform 14, as shown in FIG. 6. Most desirably, a patch of fabric 96 can be positioned at each of the four corners of platform 14 to allow a user to position containment device at any desired location beneath platform 14.

Platform 14 anti members 24, 32 and 52 of bracket 18 are preferably made of steel, such as 16 gauge reclaimed steel, and are preferably painted or coated such as by using an autophoratic coating process.

Mouse pad 16 can be made of any or a variety or materials conventionally employed in the fabrication of mouse engagement surfaces. Suitable examples include a variety of plastics such as polyvinyl chloride, or rubber. A preferred mouse pad is comprised of a flexible foamed rubber material having a felted fabric laminated to the upper, exposed side thereof. Pad 16 is preferably secured to the upper side of platform 14 with adhesives.

The mouse support accessory 10 can be retrofitted to generally any commercially available computer keyboard shelf, including the type having a spring loaded articulated arm which permits the keyboard to be stored under a worksurface, such as within the kneewell of a desk. Substantially all such keyboard shelves have at least one suitable aperture or slot near each of the lateral edges thereof which allows mounting of mouse support accessory 10 thereto. However, even in the event that a keyboard shelf does not include a suitable aperture or slot for mounting mouse support 10, such aperture can be drilled or cut into the shelf.

The ability to tilt, rotate and move the platform 14 with respect to bracket 18, provides an exceptionally flexible, ergonomically adaptable, mousing surface which can be positioned to comfortably accommodate most mouse users. The ability to move the platform 14 in a linear direction parallel to the longitudinal direction of the keyboard allows the mouse platform to be positioned over the keyboard so that the mouse support 10 together with keyboard shelf 20 and keyboard 22 can be stored even in a relatively narrow kneewell below the worksurface of a desk.

While mouse support accessory 10 is primarily intended to be supported on a computer keyboard shelf, and is believed to be most usefully employed in such manner, it will be appreciated that mouse support accessory 10 can be mounted to generally any support structure which has, or can be provided with, a suitable mounting aperture or slot. For example, mouse support accessory 10 could be mounted to the worksurface of a desk, table or other article of furniture, to the housing of a computer, or various other surfaces.

What is claimed is:

1. A computer mouse accessory, comprising:
   a platform having a substantially planar upper surface upon which a computer mouse can be operated; and
   a bracket for mounting said accessory to a support structure;
   said platform being slidably mounted on said bracket for sliding linear movement with respect to said bracket along a substantially horizontal plane;
   said bracket including a first member for mounting said computer mouse accessory to a support structure, and a second member secured to said first member, said second member being pivotally adjustable with respect to said first member.

2. The computer mouse accessory of claim 1, wherein said platform is tiltable with respect to a portion of said bracket which is stationary when mounted to a structure.

3. The computer mouse accessory of claim 2, wherein channel members are secured to the underside of said platform in spaced, parallel relationship, said channel members in combination with the underside of said platform defining channels having openings which face each other; and wherein said bracket includes a guide member having opposing flange edges which are confined within said channels.

4. The computer mouse accessory of claim 2, wherein said platform is rotatable with respect to said bracket about an axis which is substantially perpendicular to said upper surface or said platform.

5. The computer mouse accessory of claim 1, wherein said second member is secured to said first member by means of a pair of fasteners, a first of said fasteners passing through apertures in adjacent upright wall portions of said first and second members, the other of said fasteners passing through an aperture in one of said upright walls and an arcuate slot in the other of said upright walls, said arcuate slot defining an arc segment of a circle centered at said first fastener, whereby said second member can be pivoted with respect to said first member about a longitudinal axis of said first fastener through an angle defined by said arcuate slot.

6. The computer mouse accessory of claim 1, further comprising a mouse containment device secured to an underside of said platform for storing a computer mouse.

7. The computer mouse accessory of claim 1, wherein said platform defines a notch for mouse wire management.

8. A computer mouse accessory comprising:
   a platform having a substantially planar upper surface upon which a computer mouse can be operated; and
   a bracket for mounting said accessory to a support structure;
   said platform being slidably mounted on said bracket for sliding linear movement with respect to said bracket along a substantially horizontal plane, said platform being tiltable with respect to a portion of said bracket which is stationary when mounted to a support structure, and rotatable with respect to said bracket about an axis which is substantially perpendicular to said upper surface of said platform.

9. A combination computer keyboard support and computer mouse support assembly, comprising:
   a computer keyboard shelf;
   a bracket mounted to said keyboard shelf;
   a platform mounted on said bracket, said platform being slidably mounted on said bracket for sliding linear movement with respect to said bracket along a substantially horizontal plane; and
   channel members secured to an underside of said platform in spaced, parallel relationship, said channel members in combination with the underside of said platform defining channels having openings which face each other, and said bracket including a guide member having opposing flange edges which are confined within said channels.

10. The assembly of claim 9, wherein said platform is tiltable with respect to a portion of said bracket which is stationary when mounted to a structure.

11. The assembly of claim 10, wherein said bracket is comprised of a first member for mounting said computer mouse accessory to a structure, and a second member secured to said first member, said second member being pivotally adjustable with respect to said first member.

12. The assembly of claim 11, wherein said second member is secured said first member by means of a pair of fasteners, a first of said fasteners passing through apertures in adjacent upright wall portions of said first and second members, the other of said fasteners passing through an aperture in one of said upright walls and an arcuate slot in the other of said upright walls, said arcuate slot defining an arc segment of a circle centered at said first fastener, whereby said second member can be pivoted with respect to said first member about a longitudinal axis of said first fastener through an angle defined by said arcuate slot.

13. The assembly of claim 9, further comprising a mouse containment device secured to an underside of said platform for storing a computer mouse.

14. The assembly of claim 9, wherein said platform is rotatable with respect to said bracket about an axis which is substantially perpendicular to said upper surface of said platform.

15. The assembly of claim 9, wherein said platform defines a notch liar mouse wire management.

16. A computer mouse accessory, comprising:

a platform having a substantially planar upper surface upon which a computer mouse can be operated; and a bracket for mounting said platform to a computer keyboard support adjacent one end thereof;

said platform being slidably mounted on said bracket for linear movement between a first position adjacent to said one end of said keyboard support and a second position wherein said platform overlaps said one end of the keyboard support.

17. A combination computer keyboard support and auxiliary support surface for a computer input device, comprising:

a computer keyboard shelf;

a bracket mounted to said keyboard shelf; and a platform mounted on said bracket, said platform being supported for sliding linear movement with respect to said computer keyboard shelf along a substantially horizontal plane, said platform being tiltable with respect to said computer keyboard shelf and rotatable about an axis substantially perpendicular to a substantially planar upper surface of said platform.

18. The combination of claim 17, wherein said platform defines a notch for mouse wire management.

19. An auxiliary support for operation of a computer input device, comprising:

a platform having a substantially planar upper surface upon which a computer input device can be operated;

a bracket for mounting said platform to a support structure, said bracket being comprised of a first member for mounting said auxiliary support to a support structure, and a second member secured to said first member, said second member being pivotally adjustable with respect to said first member, said platform being supported on said second member; and said platform being slidably mounted upon said bracket for sliding linear movement with respect to said bracket along a substantially horizontal plane.

20. The auxiliary support of claim 19, wherein said platform is tiltable with respect to a portion of said bracket which is stationary when mounted to a structure.

21. The auxiliary support of claim 20, wherein said platform is rotatable with respect to said bracket about an axis which is substantially perpendicular to said upper surface of said platform.

22. The auxiliary support of claim 21, wherein said platform defines a notch for management of a wire electrically connecting said computer input device with a computer.

* * * * *

UNITED STATES PATENT AND TRADEMARK OFFICE
CERTIFICATE OF CORRECTION

PATENT NO. : 5,636,822                  Page 1 of 3
DATED : June 10, 1997
INVENTOR(S) : Hendershot, et al It is certified that error appears in the above-identified patent and that said Letters Patent is hereby corrected as shown below:

Column 1, Line 22;

"arc" should be --are--.

Column 2, Line 44;

After "mode" insert --of--.

Column 3, Line 29;

"tile" should be --the--.

Column 3, Line 55;

"to(he" should be --to the--.

Column 4, Line 18;

"m" should be --to--.

Column 4, Line 25;

"m" should be --to--.

UNITED STATES PATENT AND TRADEMARK OFFICE
CERTIFICATE OF CORRECTION

PATENT NO. : 5,636,822
DATED : June 10, 1997
INVENTOR(S) : Hendershot, et al

It is certified that error appears in the above-identified patent and that said Letters Patent is hereby corrected as shown below:

Column 4, Line 28;

"that" should be --flat--.

Column 4, Line 47;

After "between" insert --the--.

Column 5, Line 7;

"ill" should be --in--.

Column 5, Line 11;

"call" should be --can--.

Column 5, Line 20;

"member" should be --number--.

Column 7, Line 13;

"anti" should be --and--.

UNITED STATES PATENT AND TRADEMARK OFFICE
CERTIFICATE OF CORRECTION

PATENT NO. : 5,636,822
DATED : June 10, 1997
INVENTOR(S) : Hendershot, et al

It is certified that error appears in the above-identified patent and that said Letters Patent is hereby corrected as shown below:

Column 9, Claim 15, Line 23;

"liar" should be --for--.

Signed and Sealed this

Third Day of March, 1998

BRUCE LEHMAN

*Attest:*

*Attesting Officer*   Commissioner of Patents and Trademarks